US012797275B2

(12) United States Patent
Alqualamawi

(10) Patent No.: US 12,797,275 B2
(45) Date of Patent: Nov. 17, 2026

(54) LUMBAR SUPPORT APPLIANCE

(71) Applicant: Noor Alqualamawi, Dubai (AE)

(72) Inventor: Noor Alqualamawi, Dubai (AE)

(73) Assignee: Patnstr Holdings LLC, Laguna Niguel, CA (US)

( * ) Notice: Subject to any disclaimer, the term of this patent is extended or adjusted under 35 U.S.C. 154(b) by 0 days.

(21) Appl. No.: 19/563,070

(22) Filed: Mar. 11, 2026

(65) Prior Publication Data

US 2026/0272752 A1 Sep. 17, 2026

Related U.S. Application Data

(60) Provisional application No. 63/769,847, filed on Mar. 11, 2025.

(51) Int. Cl.

| | |
|---|---|
| ***A47G 9/10*** | (2006.01) |
| ***A47C 7/40*** | (2006.01) |
| ***A47C 7/42*** | (2006.01) |
| ***A61F 5/34*** | (2006.01) |
| ***A61G 13/00*** | (2006.01) |
| ***A61G 13/12*** | (2006.01) |
| ***G06Q 30/0201*** | (2023.01) |

(52) U.S. Cl.
CPC .......... *A61G 13/1225* (2013.01); *A47C 7/425* (2013.01); *A61G 13/009* (2013.01); *A61G 13/1265* (2013.01); *G06Q 30/02011* (2025.08)

(58) Field of Classification Search
CPC ............ A61G 13/1225; A61G 13/1265; A61G 13/009; A61G 13/123; A61G 13/127; A47C 7/425; A47C 7/407; A47C 7/42; A47C 7/40; A47C 7/467; A61F 5/024; A61F 5/028; A47G 9/1027; A47G 2009/1018

See application file for complete search history.

(56) References Cited

U.S. PATENT DOCUMENTS 5,074,765 A * 12/1991 Pekar ...................... F04B 45/04 441/91
5,406,661 A * 4/1995 Pekar ...................... F04B 33/00 36/35 B
5,824,013 A * 10/1998 Allen ........................ A61F 5/01 606/240
5,918,332 A * 7/1999 Dees .................... A47G 9/1045 5/639
6,957,462 B1 * 10/2005 Wilcox .................. A47C 7/383 5/636
2020/0054155 A1 * 2/2020 Komatick ............ A47G 9/1045

* cited by examiner

*Primary Examiner* — Camtu T Nguyen
(74) *Attorney, Agent, or Firm* — Patnstr®, APC

(57) ABSTRACT

A lumbar support cushion is adapted for accommodated reception in a lumbar curvature of a user, and includes a compressible body of elongated dimension defining a length extending in a longitudinal direction between a first end and a second end. The body includes a bore open to at least one of the first or second ends and extends generally in the longitudinal direction over at least a portion of the length. A flexible and expandable bladder is receivable in the bore and extends at least a partial distance from a one of the first or second ends. The bladder defines at least one opening through which pressurized air can be introduced into and out of the bladder, so as to control a firmness of the cushion.

5 Claims, 3 Drawing Sheets

LUMBAR SUPPORT APPLIANCE

CROSS REFERENCE TO RELATED APPLICATIONS

This application claims the benefit of U.S. Provisional Application No. 63/769,847 filed Mar. 11, 2025, entitled LUMBAR SUPPORT APPLIANCE.

FIELD OF THE INVENTION

The invention relates generally to a preventative approach to avoiding or alleviating lower back pain at least partially attributable to lack of proper back support.

BACKGROUND OF THE INVENTION

Many individuals are known to suffer from chronic, acute or generalized lower back pain. Lower back pain, which is sometimes severe, is unfortunately a common ailment, and is often manifest in individuals seated in a bad posture. Attempts are often made by the individual to improve posture in the hopes of attenuating the lumbar pain. In this regard, for example, travelers can frequently be observed at the airport or bus depot, having with them well-known conventional neck pillows, which regrettably serve no benefit in solving any problem associated with lower back issues. Even more ineffective are the typical small complementary pillows waiting for the passenger at the airplane seat upon boarding, or delivered subsequently by a flight attendant, which essentially do nothing to address and alleviate lower back pain.

There has heretofore been no article for lower back support available on the market that adequately addresses the need for something that could afford proper and effective lower back comfort/support to a user, and importantly which would provide structurally adaptive haptic feedback needed to draw attention to the need to be seated in a correct posture.

While a myriad of lower back pillows are currently commercially available, they all lack beneficial features which can provide optimal proprioceptive support for the lower back. Moreover, the ability to selectively adjust a hardness or softness of the pillow, as desired based upon the seating circumstances and individual anatomy of the user, has not heretofore been adequately addressed.

While conventional pillows that are presently on the market may provide some degree of relief to the user by improving posture to a limited degree, they are generally either too soft, and provide little in the way of support behind the back, or a bit too hard which, with the passage of time and usage, returns to soft.

It would therefore be desirable to provide a lower back support appliance that addresses the deficiencies of prior art lumbar support appliances.

SUMMARY OF THE INVENTION

Based on the foregoing, it is an object of the invention to provide a lumbar support which overcomes the drawbacks of the prior art mentioned above.

Briefly stated, a lumbar support appliance is embodied in a general form of a pillow or cushion, and advantageously includes a feature which allows selective adjustment of the hardness or softness of the appliance based on the needs of a particular user and/or the circumstances of use.

In accordance with an embodiment of the invention, a pillow (more generically, a cushion), is provided, which is configured to allow selective adjustment of a degree of overall compressive resilience. As such, a user can determine a degree of hardness or softness best suited to their individual needs and/or based upon the nature of the seat or support with which it is used.

The lower back support appliance according to an embodiment of the invention includes an outer body portion comprised of a resiliently compressible material, such as foam, thereby defining a cushioned layer presenting an elongate outer envelope of sufficient length to be received sufficiently across a back of a user when received between the user's back and a support surface, for example, a chair or seat back. The outer body portion includes a longitudinal bore, advantageously coaxially positioned about a central longitudinal, also which advantageously extends over a major or a substantial extent of a total length of the outer body portion. The appliance further includes an elongate bladder, in the form of an inflatable bag, which is receivable within the bore running codirectionally therewith, conveniently provided in a form which roughly cylindrical in shape when inflated. The bladder is configured to allow it to be pressurized to a desired extent, such that a degree of pressure will serve to allow convenient adjustment of a level of compressibility of the cushion.

The built-in and encapsulated bladder is advantageously concentrically surrounded by the outer body portion wrapped there around, and which is comprised of a body of foam having specific density that will allow the internal bladder to be inflated to make the cushion harder (when inflated) or softer (when deflated) based on individual preference, nature of the back support surface, and unique anatomical features of the particular user.

While a pump for compressing air in the inflatable bladder can conceivably be provided separate from the foam outer body portion/bladder combination, for operational convenience, a pump is optionally and advantageously provided as an integral feature, for example, being disposed at an end of the cushion so as not to interfere with contact of the lumbar back of the user with the compressible portion of the cushion. A detachable strap is optionally provided, and provided with the option to the user to use the cushion with the strap in place and attached, or with the strap removed for potentially greater comfort. The strap is advantageously adjustable to allow securing to a seat of chair, and to facilitate carrying.

In accordance with a particularly advantageous embodiment, the bladder is inflated by pressing on an exposed elastomeric dome which comprises an actuation portion of an integrated air pump. Actuation of the pump introduces air into the bladder with which it is in communication so that the cushion gets progressively harder with each push on the dome. A release valve for conveniently deflating the bladder is also provided which, when pressed, returns the cushion to the original soft compliance, or somewhere between soft and firm. The deflate valve (also referred to equivalently herein as a release valve) may be pressed briefly once to release a little air, or deeply pressed and held down to release essentially the entirety of compressed air in the bladder.

A removable cover is optionally provided, advantageously comprised of a breathable mesh fabric. The cover can include a closure conveniently in a form of a zipper to allow removal or subsequent re-attachment of same to the foam/bladder/pump mechanism.

A method of marketing a lumbar supportive pillow implemented by a vender or provider of the headband to a potential recipient thereof is also contemplated withing the scope of the invention, intended to assign infringement to a vendor or provider who engages in practice of the marketing method. Therefore, any vendor or provider who instructs the potential buyer to use the lumbar pillow according to the structural embodiments(s) of the invention in a manner placing the pillow in general conformance the curvature of the lumbar back, in order to apply compression in user-selectable resilience could be held accountable for infringement without having to prove such actual use by the potential recipient.

The above, and other objects, features and advantages of the present invention will become apparent from the following description read in conjunction with the drawings.

DETAILED DESCRIPTION OF THE INVENTION

Before describing the invention in detail, it is noted that for purposes herein, the terms "pillow" and "cushion" are intended to have like meaning, and are used interchangeably.

Figure 1:
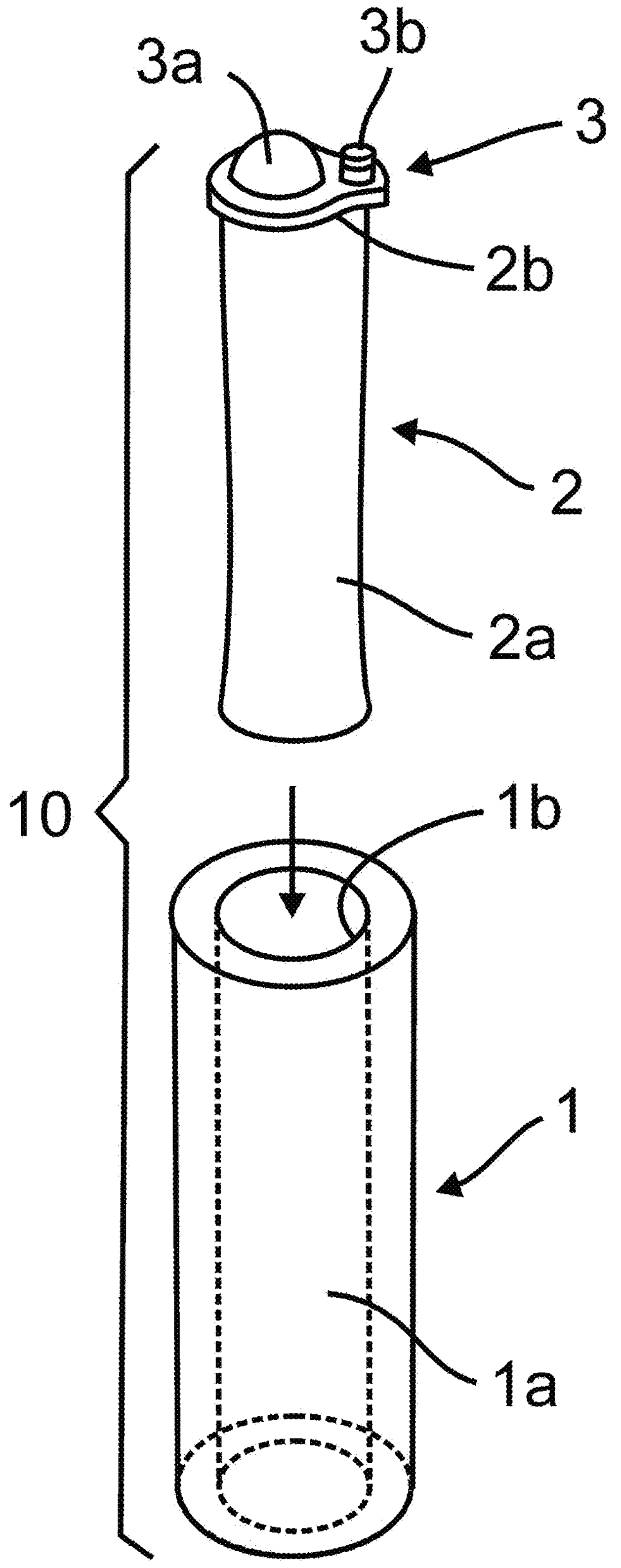
FIG. 1 is an exploded view of an embodiment of a lumbar appliance depicting a bladder and foam body portion.

Referring now to the drawings, and in particular FIG. 1, an exploded view of pillow/cushion according to an embodiment of the invention is shown and identified at reference numeral 10.

A lumbar support appliance is provided generally in a form of a cushion 10, comprising an outer body portion 1, comprised of a suitable foam material, and optionally provided in a form of a generally elongated cylindrical annulus 1*a* defining a bore 1*b* which extends over at least a length portion of a longitudinal extent of the outer body portion 1. An inflatable flexible bladder 2 is provided, and which includes a flexible bag portion 2*a* receivable within bore 1*b* of outer body portion 1 to permit adjustability of support resilience of cushion 10. Bag portion 2*a* advantageously occupies a major or substantial portion of a length of bore 1*b*. In the depicted example of FIG. 1, bore 1 and an inflatable bag portion 2*a* of bladder 2 both extend substantially over a total length of outer body portion 1, advantageously allowing resilience adjustment essentially end-to-end.

It is noted that the term "bore" as used herein extends in meaning to any channel, hollow or passage, etc., within outer body portion 1, and can be formed by any suitable process, including fabrication, suitable molding techniques, rolling and fastening of a foam sheet, etc. It is further noted that bag portion 2*a* can be produced by any suitable method known to those skilled in the art, or techniques to be developed in the future, which results in an airtight bladder 2.

Disposed at an end 2*b* of bladder 2 is an air pump mechanism 3 communicative with an interior of bag portion 2*a* which advantageously provides a convenient integrated mechanism which, when operated, allows facilitated adjustment of a degree of pressure within bag portion 2*a* of bladder 2. Pump mechanism 3 comprises a resiliently flexible pressurizing domed bulb 3*a* for increasing pressure in bladder 2, and a release valve 3*b* for reducing pressure. Both domed bulb 3*a* and release valve 3*b* are communicative with an interior of bag portion 2*a*, as will described in greater detail below with reference to FIGS. 2 and 3.

Figure 2:
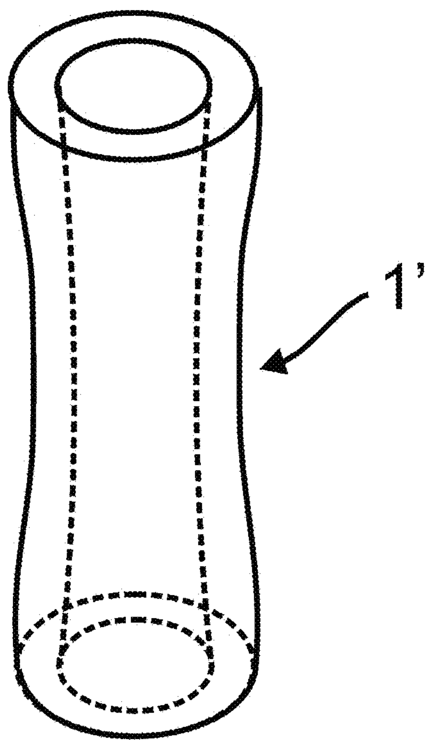
FIG. 2 is a perspective view of an alterative embodiment of the foam body portion of FIG. 1.

Outer foam portion need not be cylindrical, and can, if so desired be made any shape suited for a particular situation and anatomy of the user. One such example is shown in FIG. 2, in which an alternative outer foam portion 1' is tapered from either end towards a central region. Other ergonomic shapes are of course also possible, as will be understood by a skilled artisan.

In accordance with embodiments of the invention, for expediency and the convenience of a user in implementing firmness adjustment as desired, as mentioned above herein, cushion 10 advantageously includes an integral air pump, as exemplified as pump mechanism 3 provided conveniently in an end position of cushion 10 as shown in FIGS. 1 and 2. It is noted that the embodiment depicted represents utilization of one of many suitable pump types and mechanism that can be used in furtherance of practice of the invention described herein, and is shown for purposes of illustrating the versatility of the disclosed concept.

Figure 3:
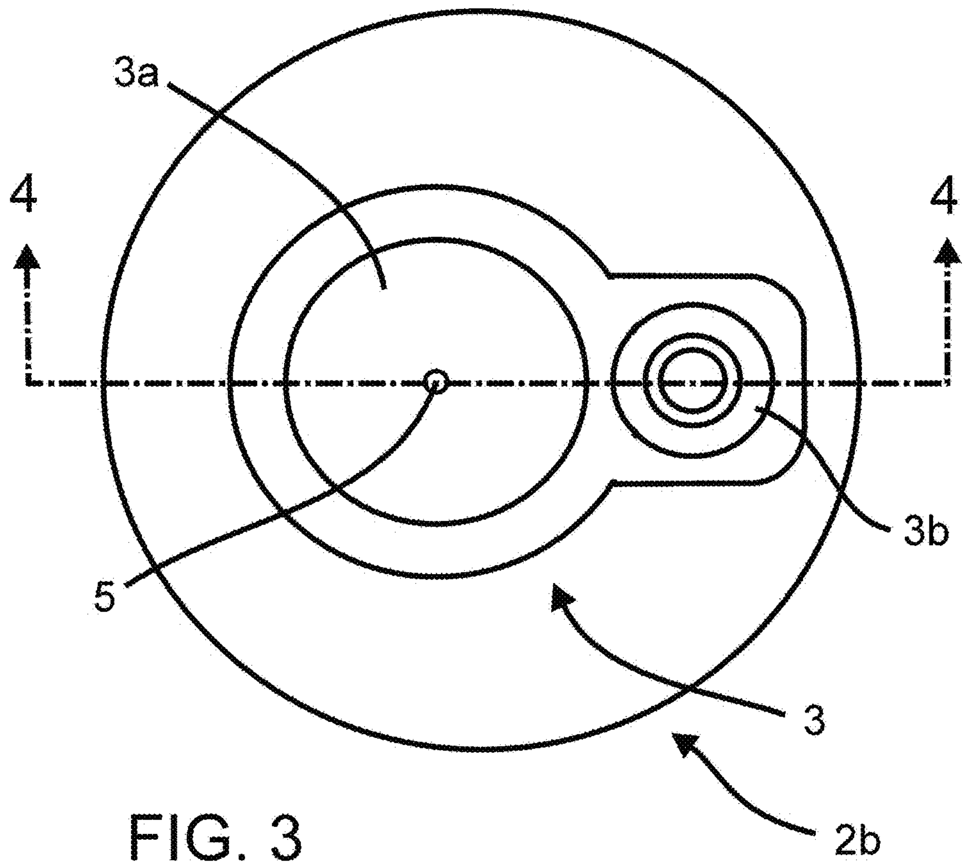
FIG. 3 is an end view of the cushion embodiment of FIG. 1, showing an embodiment of an integral pump mechanism.
Figure 4:
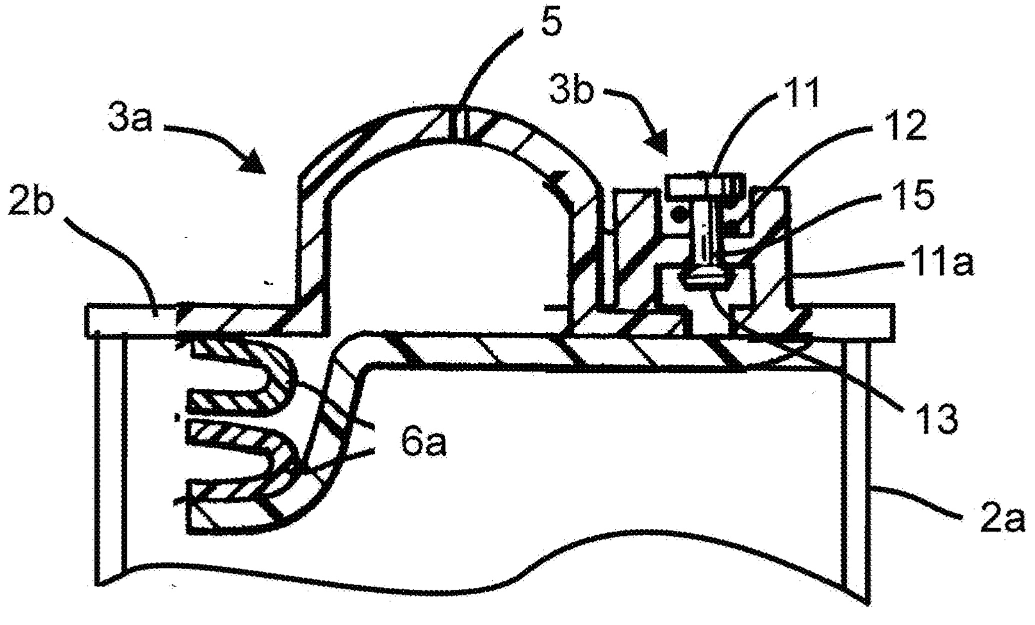
FIG. 4 is a cross-sectional view taken along line 3-3 in FIG. 2.

Turning now to FIGS. 3 and 4, the details of the exemplary integrated air pump system is show and described in detail with reference thereto. The pump shown, is conveniently of a general type as disclosed in U.S. Pat. No. 5,113,599 issued to Cohen et al., the disclosure of which is incorporated herein by reference.

FIG. 3 depicts an end view of cushion 10, in which position pump mechanism 3, which is provided as an integral part of bladder 2, is accessible. As seen in FIG. 1, a mounting platform 2*b* is provided at an end of bladder 2 on which pump mechanism 3 is carried. As described previously herein, pump mechanism (of the type conveniently selected for use and shown) includes pressurizing dome 3*a* for increasing pressure in bladder 2, and a release valve 3*b* for reducing pressure as needed.

FIG. 4 depicts a cross-section of the view in FIG. 2 taken along line 3-3. As depicted, pump mechanism 3 is shown carried on mounting platform 2*b* in mounted fashion. However, it is noted that while such mounting is feasible, mounting platform 2*b* and pump mechanism 3 can be combined as an integrally combined single unit without departure from the invention.

Pump mechanism 3 includes pressurizing domed bulb 3*a* which is made of a rubber or other suitable elastomeric material, and may be molded from rubber such as butyl rubber or a latex rubber to form a rubber bulb having a generally hemispherical domed top. Domed bulb 3*a* may also be a molded urethane or other material having good satisfactory memory characteristics.

For economy and simplicity of construction, the embodiment selected for depiction omits the use of a formal check valve for selectively preventing escape of air to the outside when domed bulb 3*a* is forcibly compressed by the fingers of the user and allowing air to enter the domed bulb when hand pressure is released. Rather, a simplified mechanism is shown in the depicted example, as described below.

In the embodiment shown in FIGS. 3 and 4, a small hole 5 is formed on the top of the domed bulb 3*a*. Hole 5 obviates the need for a one way check valve since the thumb or other fingers of the user's hand blocks hole 5 when domed bulb 3*a* is pressed, preventing escape of air to the outside, and as the domed bulb 3*a* is released by the user, the small hole is uncovered, allowing air to enter the domed bulb 3*a* from the outside.

As seen in FIG. 4, a one way valve 6 is conveniently provided in a simple form, located between domed bulb 3*a* and bag portion 2*a*. One way valve 6 utilizes a pair of sheets of urethane or similar material which are folded in substantially a U-shapes facing each other (shown at 6*a*), and the gap therebetween allows air to pass therethrough only in the direction of arrow 7, into bag portion 2*a* to pressurize same.

Release valve 3*b* of pump mechanism 3, disposed adjacent to a side of domed bulb 3*a* in the depicted example, is operable to release the air from bag portion 2*a*, as desired. While a wide assortment of release valves can be used without departure from the invention, release valve 3*b*, shown and described by example, is simple and effective. Release valve 3*b* includes a plunger 11 biased by a spring 12 received around a stem portion 11*a* of plunger 11, maintaining release valve 3*b* in the closed valve position, as shown FIG. 3. A flange 13 around the periphery of stem portion 11*a* of plunger 11 in biased contact with a stop of a release fitting 14 prevents air from escaping between plunger 11 and release fitting 14. To release air from bladder 2, plunger 11 is depressed by the user against the force of spring 12, allowing air escape around stem 11*a*. Appropriate selection of materials for release valve 3, readily arrived at by a skilled artisan, will assure an air tight seal when release valve 3 is closed.

When pressed, release valve 3 operates to return cushion 10 to its original soft compliance, or somewhere between soft and firm. Release valve 3 may be pressed briefly once to release a little air, or deeply pressed and held down to release essentially the entirety of compressed air in the bladder.

Figure 5:
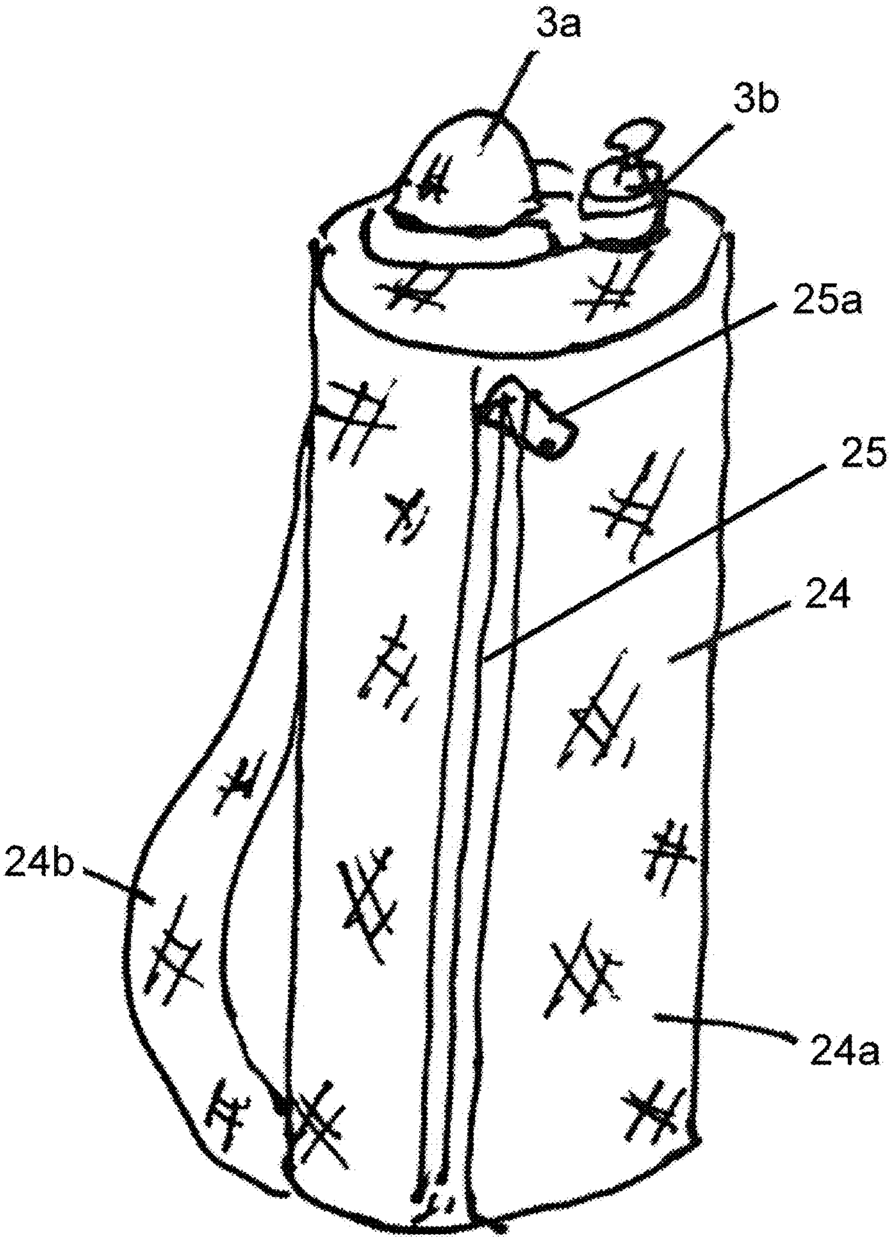
FIG. 5 is a perspective view of the lumbar appliance of FIG. 1 shown as contained in a removable cover wrapping the foam body portion and an integral pump mechanism included therewith.

Turning now to FIG. 5, an optional cover 24 for reception about body 1 is depicted. Cover 24 includes an enveloping portion 24*a* in which the body 1 is receivable conveniently through a zippered slot 25 openable by a zipper tab 25*a*. Cover 24 optionally includes a carry/securement strap 24*b* which is either permanently attached to enveloping portion 4*a* or is made removable. Strap 24*b* provides, inter alia, facilitated carrying and or particularly when made optionally length-adjustable, a way to be secured in place to a seat back. Cover 4 is advantageously comprised of breathable mesh fabric. A suitable type of foam used for outer body portion 1 advantageously comprises PU foam. TPU optionally comprises bladder 2. While in no way limiting to many other sizes deemed within the scope of the invention, diameter of cushion 10, for example, can be about 11.5 cm, and a length thereof being about 27.5 cm.

A method of marketing a lumbar support pillow implemented by a vender or provider of the lumbar support appliance to a potential buyer thereof including a user, a physical therapy facility or a care provider for the user, is also contemplated withing the scope of the invention, intended to assign infringement to a vendor or provider who engages in practice of the marketing method. Therefore, any vendor or provider who instructs the potential buyer/recipient to use the lumbar cushion/pillow disclosed herein in a manner placing the pillow in a curvature of the lumbar back could be held accountable for infringement without having to prove such actual use of the method by the potential recipient.

While several embodiments of the present disclosure have been described and illustrated herein, those of ordinary skill in the art will readily envision a variety of other means and/or structures for performing the functions and/or obtaining the results and/or one or more of the advantages described herein, and each of such variations and/or modifications is deemed to be within the scope of the present disclosure. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings of the present disclosure is/are used.

Those skilled in the art will recognize, or be able to ascertain using no more than routine experimentation, many equivalents to the specific embodiments of the disclosure described herein. It is, therefore, to be understood that the foregoing embodiments are presented by way of example only and that, within the scope of the appended claims and equivalents thereto, the disclosure may be practiced otherwise than as specifically described and claimed. The present disclosure is directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one." The phrase "and/or," as used herein in the specification and in the claims, should be understood to mean "either or both" of the elements so conjoined, i.e., elements that are conjunctively present in some cases and disjunctively present in other cases. Other elements may optionally be present other than the elements specifically identified by the "and/or" clause, Whether related or unrelated to those elements specifically identified, unless clearly indicated to the contrary.

Reference throughout this specification to "one embodiment" or "an embodiment" means that a particular feature, structure, or characteristic described in connection With the embodiment is included in at least one embodiment. Thus, appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims.

Reference throughout this specification to "one embodiment", "an embodiment", or similar language means that a particular feature, structure, or characteristic described in connection with the embodiment is included in at least one embodiment of the present invention. Thus, appearances of the phrases "in one embodiment", "in an embodiment", and similar throughout this specification may, but do not necessarily, all refer to the same embodiment.

Furthermore, the described features, structures, or characteristics of the invention may be combined in any suitable manner in one or more embodiments. In the following description, numerous specific details are provided to provide a thorough understanding of embodiments of the invention. One skilled in the relevant art will recognize, however, that the invention may be practiced without one or more of the specific details, or with other methods, components, materials, and so forth. In other instances, well-known structures, materials, and so forth. In other instances, well-known structures, materials, or operations are not shown or described in detail to avoid obscuring aspects of the invention.

The schematic flow chart diagrams included herein are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Unless otherwise indicated, all numbers expressing quantities of ingredients, properties such as molecular weight, reaction conditions, and so forth used in the specification and claims are to be understood as being modified in all instances by the term "about." Accordingly, unless indicated to the contrary, the numerical parameters set forth in the specification and attached claims are approximations that may vary depending upon the desired properties sought to be obtained by the present invention. At the very least, and not as an attempt to limit the application of the doctrine of equivalents to the scope of the claims, each numerical parameter should at least be construed in light of the number of reported significant digits and by applying ordinary rounding techniques. Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in their respective testing measurements.

The terms "a," "an," "the" and similar referents used in the context of describing the invention (especially in the context of the following claims) are to be construed to cover both the singular and the plural, unless otherwise indicated herein or clearly contradicted by context. Recitation of ranges of values herein is merely intended to serve as a shorthand method of referring individually to each separate value falling within the range. Unless otherwise indicated herein, each individual value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein is intended merely to better illuminate the invention and does not pose a limitation on the scope of the invention otherwise claimed. No language in the specification should be construed as indicating any non-claimed element essential to the practice of the invention.

Groupings of alternative elements or embodiments of the invention disclosed herein are not to be construed as limitations. Each group member may be referred to and claimed individually or in any combination with other members of the group or other elements found herein. It is anticipated that one or more members of a group may be included in, or deleted from, a group for reasons of convenience and/or patentability. When any such inclusion or deletion occurs, the specification is deemed to contain the group as modified thus fulfilling the written description of all Markush groups used in the appended claims.

Certain embodiments of this invention are described herein, including the best mode known to the inventors for carrying out the invention. Of course, variations on these described embodiments will become apparent to those of ordinary skill in the art upon reading the foregoing description. The inventor expects skilled artisans to employ such variations as appropriate, and the inventors intend for the invention to be practiced otherwise than specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

Specific embodiments disclosed herein may be further limited in the claims using consisting of or consisting essentially of language. When used in the claims, whether as filed or added per amendment, the transition term "consisting of" excludes any element, step, or ingredient not specified in the claims. The transition term "consisting essentially of" limits the scope of a claim to the specified materials or steps and those that do not materially affect the basic and novel characteristic(s). Embodiments of the invention so claimed are inherently or expressly described and enabled herein.

As one skilled in the art would recognize as necessary or best-suited for performance of the methods of the invention, a computer system or machines of the invention include one or more processors (e.g., a central processing unit (CPU) a graphics processing unit (GPU) or both), a main memory and a static memory, which communicate with each other via a bus.

A processor may be provided by one or more processors including, for example, one or more of a single core or multi-core processor (e.g., AMD Phenom II X2, Intel Core Duo, AMD Phenom II X4, Intel Core i5, Intel Core I & Extreme Edition 980X, or Intel Xeon E7-2820).

An I/O mechanism may include a video display unit (e.g., a liquid crystal display (LCD) or a cathode ray tube (CRT)), an alphanumeric input device (e.g., a keyboard), a cursor control device (e.g., a mouse), a disk drive unit, a signal generation device (e.g., a speaker), an accelerometer, a microphone, a cellular radio frequency antenna, and a network interface device (e.g., a network interface card (NIC), Wi-Fi card, cellular modem, data jack, Ethernet port, modem jack, HDMI port, mini-HDMI port, USB port), touchscreen (e.g., CRT, LCD, LED, AMOLED, Super AMOLED), pointing device, trackpad, light (e.g., LED), light/image projection device, or a combination thereof.

Memory according to the invention refers to a non-transitory memory which is provided by one or more tangible devices which preferably include one or more machine-readable medium on which is stored one or more sets of instructions (e.g., software) embodying any one or more of the methodologies or functions described herein. The software may also reside, completely or at least partially, within the main memory, processor, or both during execution thereof by a computer within system, the main memory and the processor also constituting machine-readable media. The software may further be transmitted or received over a network via the network interface device.

While the machine-readable medium can in an exemplary embodiment be a single medium, the term "machine-readable medium" should be taken to include a single medium or multiple media (e. g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present invention. Memory may be, for example, one or more of a hard disk drive, solid state drive (SSD), an optical disc, ?ash memory, zip disk, tape drive, "cloud" storage location, or a combination thereof. In certain embodiments, a device of the invention includes a tangible, non-transitory computer readable medium for memory. Exemplary devices for use as memory include semiconductor memory devices, (e. g., EPROM, EEPROM, solid state drive (SSD), and flash memory devices e.g., SD, micro SD, SDXC, SDIO, SDHC cards); magnetic disks, (e.g., internal hard disks or removable disks); and optical disks (e.g., CD and DVD disks).

Furthermore, numerous references have been made to patents and printed publications throughout this specification. Each of the above-cited references and printed publications are individually incorporated herein by reference in their entirety.

In closing, it is to be understood that the embodiments of the invention disclosed herein are illustrative of the principles of the present invention. Other modifications that may be employed are within the scope of the invention. Thus, by way of example, but not of limitation, alternative configurations of the present invention may be utilized in accordance with the teachings herein. Accordingly, the present invention is not limited to that precisely as shown and described, and that various changes and modifications may be effected therein by one skilled in the art without departing from the scope or spirit of the invention.

What is claimed is:

1. A lumbar support pillow adapted for accommodated reception in a lumbar curvature of a user, comprising:

a compressible body of elongated dimension defining a length extending in a longitudinal direction between a first end and a second end, said body including a bore open to at least one of said first or second ends and extending generally in said longitudinal direction over at least a portion of said length;

a bladder including an inflatable bag portion receivable in said bore and extending from said one of said first or second ends said bladder defining at least one opening through which air can be introduced into and out of said bladder, said bladder further comprising a mounting platform integrally formed with a first end of said inflatable bag portion; and a pump communicative with said at least one opening in said bladder, said pump including an air compression mechanism comprised of a resilient dome which creates increasing air pressure within said bladder when repeatedly pressed, said pump further including an air release mechanism operable to selectively release at least a portion of compressed air in said bladder to thereby allow adjustment of pressure within said inflatable bag portion, said air compression mechanism and said air release mechanism being carried on an outward facing surface of said mounting platform.

2. A lumbar support pillow according to claim 1, wherein said elongated dimension presents a generally cylindrical envelope.

3. A lumbar support pillow according to claim 1, wherein said compressible body comprises a resiliently deformable foam.

4. A lumbar support pillow according to claim 1, further comprising:

a removable cover suitably configured for at least partially enveloping said body and said bladder combination.

5. A lumbar support pillow according to claim 4, wherein said removable cover is comprised of breathable mesh material.

* * * * *